US008108341B2

(12) United States Patent
Barsook et al.

(10) Patent No.: US 8,108,341 B2
(45) Date of Patent: Jan. 31, 2012

(54) METHOD AND SYSTEM ENABLING IDENTIFICATION OF INFORMATION CONTENT HAVING ENHANCED DESIRABILITY TO A USER

(75) Inventors: Jonathan David Barsook, Los Angeles, CA (US); Khai T. Tran, Burbank, CA (US); Marykate Haley, Pasadena, CA (US); Arun Ramagopal, Los Angeles, CA (US); David Ehlers, Burbank, CA (US); Jonathon Ruppel, Marina Del Rey, CA (US); Russell Armand, Los Angeles, CA (US); Miles Kemp, Los Angeles, CA (US); Sean Porter, North Hollywood, CA (US); Shashank Khetan, Culver City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 431 days.

(21) Appl. No.: 12/148,164

(22) Filed: Apr. 16, 2008

(65) Prior Publication Data

US 2009/0265359 A1   Oct. 22, 2009

(51) Int. Cl.
  *G06F 17/30*   (2006.01)
(52) U.S. Cl. ........................................ 707/618; 707/754
(58) Field of Classification Search .................. 707/618, 707/754
  See application file for complete search history.

(56) References Cited

U.S. PATENT DOCUMENTS

| | | | |
|---|---|---|---|
| 2002/0054117 A1* | 5/2002 | van Dantzich et al. | 345/766 |
| 2003/0020749 A1* | 1/2003 | Abu-Hakima et al. | 345/752 |
| 2003/0229629 A1* | 12/2003 | Jasinschi et al. | 707/3 |
| 2005/0159970 A1* | 7/2005 | Buyukkokten et al. | 705/1 |
| 2007/0288292 A1* | 12/2007 | Gauger | 705/9 |
| 2007/0300158 A1* | 12/2007 | Kasperkiewicz et al. | 715/731 |
| 2008/0005086 A1* | 1/2008 | Moore | 707/3 |
| 2008/0071616 A1* | 3/2008 | Hovnanian et al. | 705/14 |
| 2008/0126303 A1* | 5/2008 | Park et al. | 707/3 |
| 2008/0133569 A1* | 6/2008 | Vu et al. | 707/102 |
| 2009/0042549 A1* | 2/2009 | Lee | 455/414.4 |
| 2009/0061925 A1* | 3/2009 | Finkelstein et al. | 455/552.1 |

* cited by examiner

*Primary Examiner* — Son T Hoang
(74) *Attorney, Agent, or Firm* — Farjami & Farjami LLP

(57) ABSTRACT

A method of enabling identification of information content having enhanced desirability to a user comprises collecting content into an information database, updating the collected content according to one or more updating schedules, filtering the updated content by reference to at least one theme, associating each of the filtered content items with a respective visual representation, and labeling the respective visual representations with one or more visual cues corresponding to one or more discrimination criteria. A system for enabling same comprises an information database configured to store collected content and accessible via a content server, an aggregator configured to update the collected content, an interactive content selection application configured to provide a user interface enabling filtering of the updated collected content, and a visualization module configured to associate the filtered content items with a visual representation and label each with one or more visual cues.

22 Claims, 4 Drawing Sheets

METHOD AND SYSTEM ENABLING IDENTIFICATION OF INFORMATION CONTENT HAVING ENHANCED DESIRABILITY TO A USER

BACKGROUND OF THE INVENTION

1. Field of the Invention

The present invention relates generally to providing information content. More particularly, the present invention relates to providing computer mediated information content.

2. Background Art

The famous sailor's lament "water, water everywhere, and not a drop to drink" is equally apropos of the sea of information continuously competing for our attention as a result of advances made possible by modem communication technology. Much as the historical seafarer was tormented by juxtaposition of the proximity of so much water with the rationing of his very limited supply of its drinkable variety, individuals living in the present information age are sometimes frustrated in their attempts to obtain personally timely and interesting items of information, due to the ocean of information content with which they find themselves inundated. For both the metaphorical mariner and the modem information seeker, the problem is not the absence of a resource, but rather the need to distill that which is desirable and needed from that which may be plentiful, but embodies little value to the user.

Extracting information that is personally desirable from the vastly greater body of information that is not, can, however, be a demanding undertaking, and may often become overwhelming. The active efforts required in order to differentiate among alternative items of information to distinguish value from superficiality, and timeliness from obsolescence, may leave the inquiring mind spent, and in the process, squander one of our least abundant resources—time. In short, the potential wealth of information continuously available to us is rendered far less useful than it could be, due to its being subsumed and made unrecognizable by its own abundance.

A reactionary and largely unproductive approach to solving the problems associated with information overload, is to disengage from its sources and turn away from the stresses and confusions they create, in the optimistic faith that the more prosaic mechanisms that have served adequately well in the past, will continue to alert us to critically needed or highly desirable news in the future. While perhaps effective in avoiding the personal stresses created by having to actively contend with available information, that approach is at the very least intellectually regressive, and deprives us of the potential benefits available from a selective harvesting of the wealth of information provided by our hard earned technological advances.

A more balanced conventional approach to solving the problems of information overload utilizes computer based information management tools to sort and summarize available items of information, by subject matter or otherwise. This approach allows an information seeker to more rapidly analyze an information item and evaluate the likelihood that it may be relevant or desirable based on that information seeker's personal interests. A significant disadvantage of this widely implemented conventional solution, however, is that it requires the information seeker to engage individual items in a deductive analytical process, albeit a more focused and streamlined one. By requiring an information seeker to read and absorb a digest or synopsis of the information content, this present approach continues to impose significant burdens on his or her time and cognitive resources.

Accordingly, there is a need to overcome the drawbacks and deficiencies in the art by providing a solution that allows an information seeker to engage information content in a less analytical way, thereby enabling a more intuitive recognition of information content having enhanced desirability.

SUMMARY OF THE INVENTION

There are provided methods and systems enabling identification of information content having enhanced desirability to a user, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
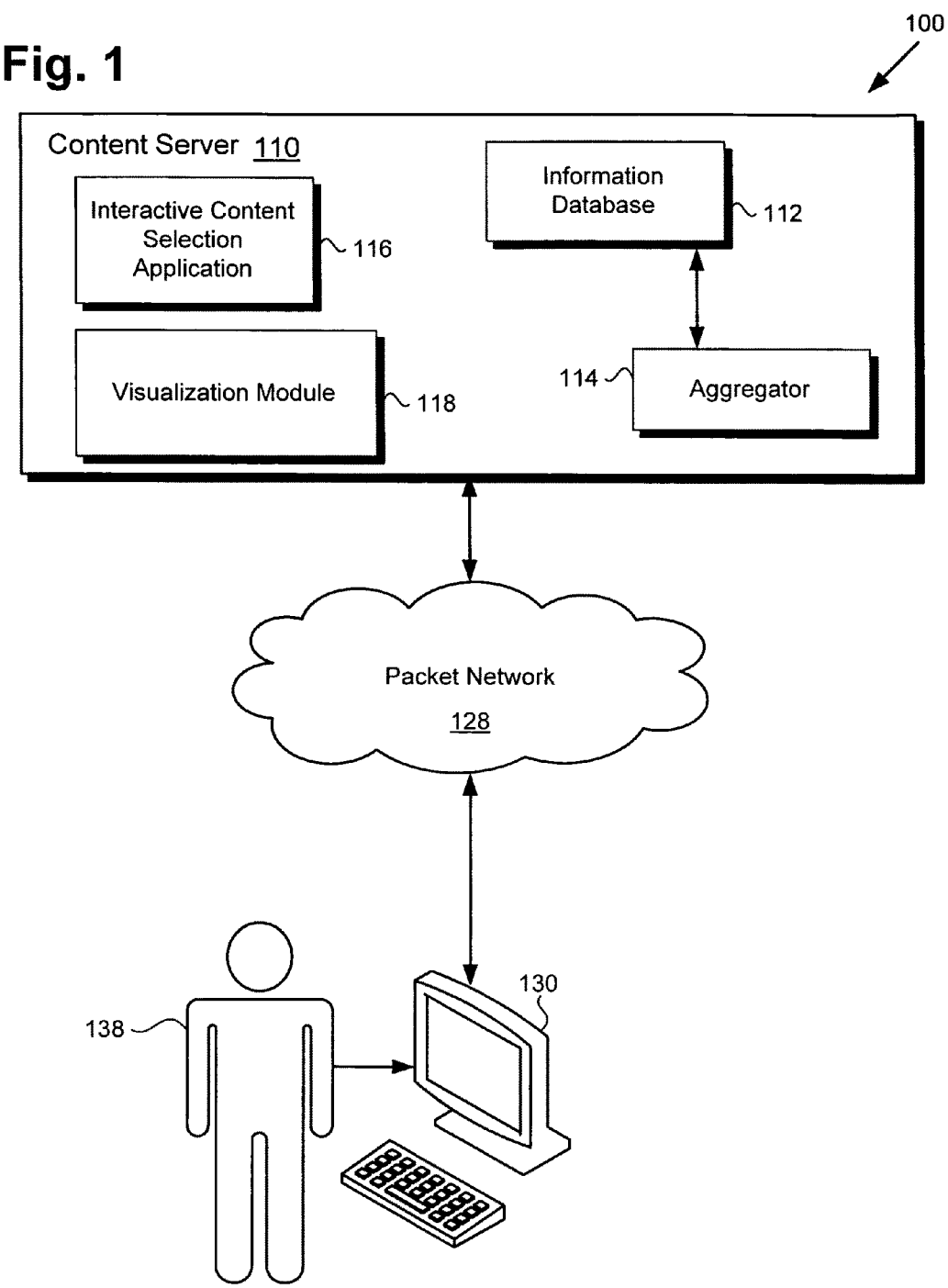
FIG. 1 shows a diagram of an exemplary system for enabling identification of information content having enhanced desirability to a user, according to one embodiment of the present invention.

The present application is directed to a method and system enabling identification of information content having enhanced desirability to a user. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows a diagram of exemplary system 100 for enabling identification of information content having enhanced desirability to a user, according to one embodiment of the present invention. In the embodiment of FIG. 1, system 100 comprises content server 110 including information database 112, aggregator 114, interactive content selection application 116, and visualization module 118. Also shown in FIG. 1 are packet network 128, client computer 130, and user 138.

According to the embodiment of FIG. 1, user 138 may utilize interactive content selection application 116 and visualization module 118, which may be downloaded to client computer 130 over packet network 128, for example, to access information database 112 on content server 110. The information content collected in information database 112 may be periodically refreshed or updated by data provided from aggregator 114, which may, for example, pull Really Simple Syndication (RSS) data feeds according to one or more updating schedules.

Interactive content selection application 116 may be configured to provide a user interface enabling filtering of the updated information content collected in information database 112, by reference to one or more themes identified as being subject matter of interest to user 138. In addition, visualization module 118 may be configured to associate the content items filtered by interactive content selection application 116 as being of potential interest to user 138 with visual representations, and to label the respective visual representations with visual cues corresponding to discrimination criteria. Discrimination criteria may correspond to standards specified by user 138, for example, or comprise predetermined discrimination criteria, such as how recently the item of information content was created or updated, or how popular the item of information content was with other viewers of that content.

Thus, in one embodiment, the information content collected on information database 112 and updated by aggregator 114 may be hosted for the enjoyment and evaluation of a community of users, i.e., other users such as user 138 who may access content server 110. In that exemplary embodiment, members of the online community may view items of content collected in information database 112, and indicate their level of enjoyment by providing a rating feedback. The feedback from individual users may then be collated to determine a popularity of the content item among the community of users. Similarly, user 138 may access information content collected in information s database 112, and provide a rating feedback. In one embodiment, in addition to providing feedback, members of the community of users may supplement the content collected in information database 112 by submitting additional content to be included and made available on content server 110. It is noted that although client computer 130 is represented as a personal computer (PC) in FIG. 1, in one embodiment client computer 130 may comprise a mobile communication device such as a tablet computer, mobile telephone, or personal digital assistant (PDA), for example.

As shown in FIG. 1, interactive content selection application 116 and visualization module 118 may be accessed through packet network 128. In that instance, interactive content selection application 116 and visualization module 118 may comprise web applications, accessible over a packet network such as the Internet, for example. Alternatively, interactive content selection application 116 and visualization module 118 may reside on a server supporting a local area network (LAN), or be included in another type of limited distribution network. In another embodiment, interactive content selection application 116 and visualization module 118 may be stored on a portable computer readable storage medium such as a compact disc read-only memory (CD-ROM). In an analogous manner, in another embodiment, information database 112 and aggregator 114 may reside on a server supporting a LAN or other limited distribution network.

Figure 2:
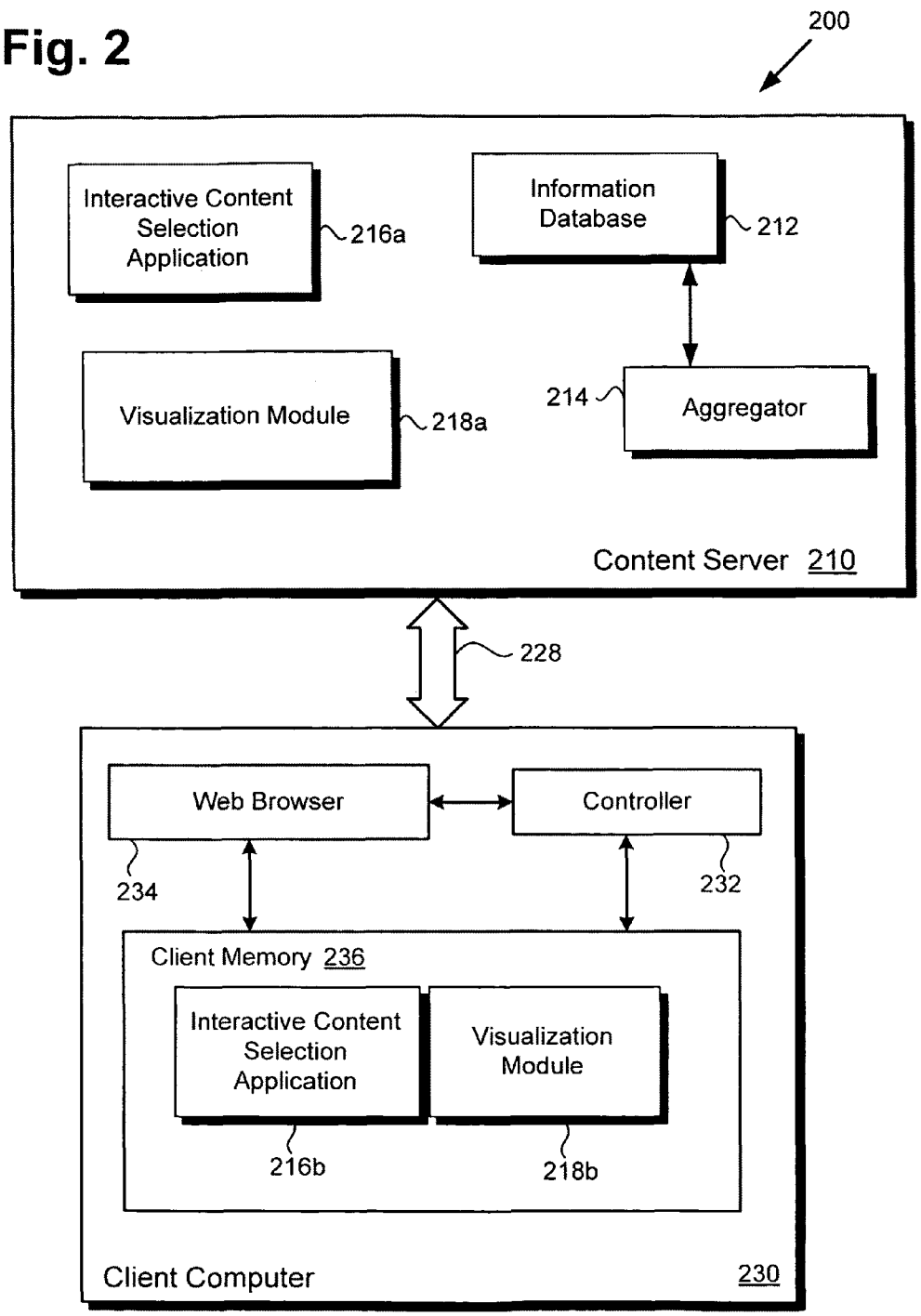
FIG. 2 shows a more detailed exemplary embodiment of a system for enabling identification of information content having enhanced desirability to a user, according to one embodiment of the present invention.

Turning now to FIG. 2, FIG. 2 shows a more detailed exemplary embodiment of system 200 for enabling identification of information content having enhanced desirability to a user, according to one embodiment of the present invention. System 200 in FIG. 2 includes client computer 230 receiving a download via communication link 228 from content server 210. Content server 210 is shown to include information database 212, aggregator 214, interactive content selection application 216a, and visualization module 218a, and corresponds respectively to content server 110 including information database 112, aggregator 114, interactive content selection application 116, and visualization module 118, in FIG. 1. Moreover, client computer 230 corresponds to client computer 130, in FIG. 1. As shown in FIG. 2, client computer 230 comprises controller 232, web browser 234, and client memory 236. Also shown in FIG. 2 are interactive content selection application 216b and visualization module 218b, on client computer 230.

In the present embodiment, interactive content selection application 216b and visualization module 218b are located in client memory 236, having been received from content server 210 via communication link 228. In the present embodiment, communication link 228 represents download of interactive content selection application 216a and visualization module 218a over a packet network, for example. In another embodiment, communication link 228 may represent transfer of interactive content selection application 216a and visualization module 218a from a CD-ROM or other portable computer readable storage medium. Once transferred, interactive content selection application 216b and visualization module 218b may be stored in client memory 236 and run locally on client computer 230. It is noted that communication link 228 is shown as a two-way communication, to represent to transfer of data corresponding to rating feedback or supplemental content provided from a user of client computer 230 to content server 210.

Controller 232 may be the central processing unit for client computer 230, for example, in which role controller 232 runs the client computer operating system, launches web browser 234, and facilitates use of interactive content selection application 216b and visualization module 218b. Web browser 234, under the control of controller 232, may execute interactive content selection application 216b and display visual representations and visual cues provided by visualization module 218b, to enable a user of client computer 230 to identify information content located in information database 212 having enhanced desirability to the user.

Figure 3:
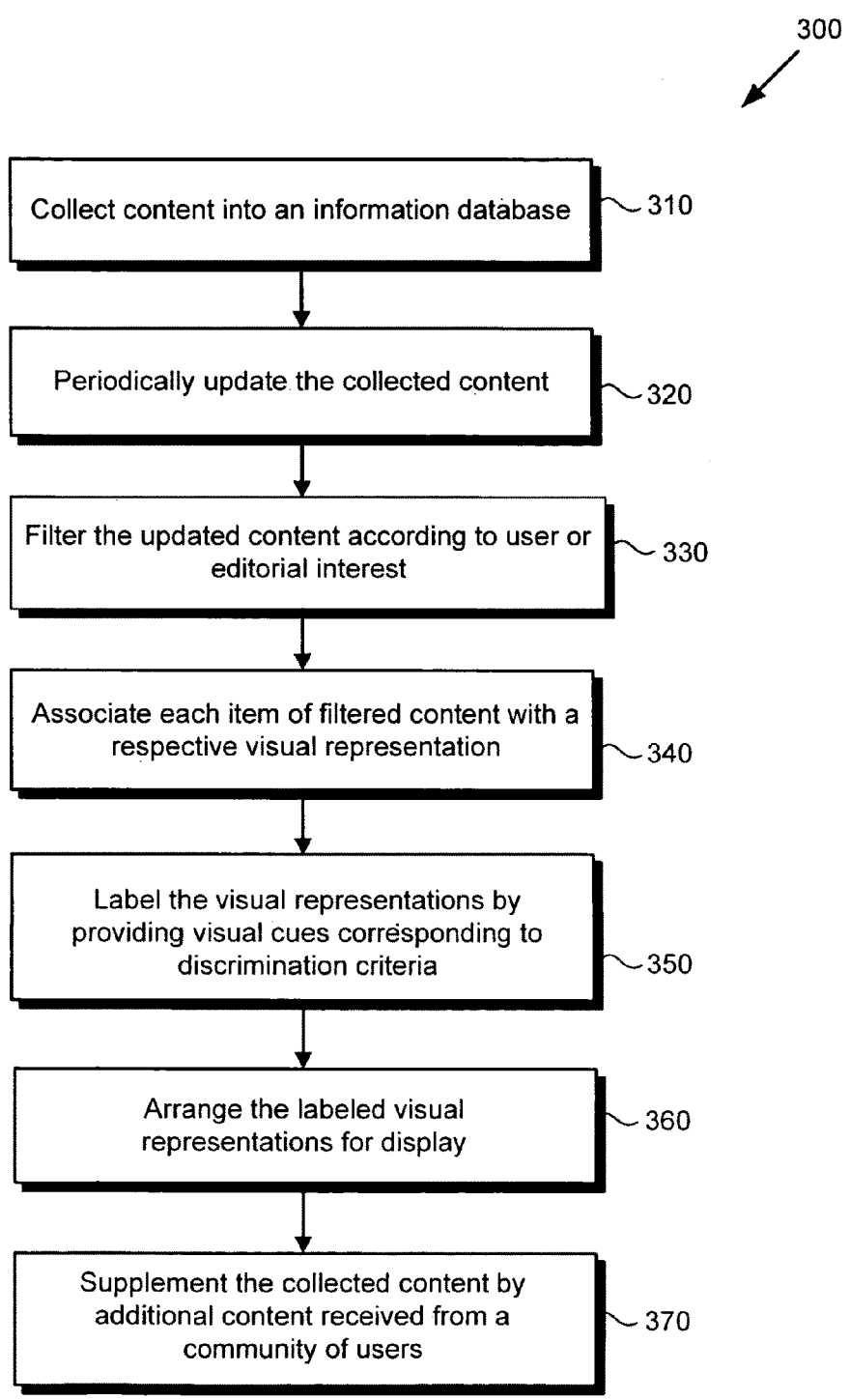
FIG. 3 is a flowchart presenting a method of enabling identification of information content having enhanced desirability to a user, according to one embodiment of the present invention.

FIGS. 1 and 2 are now further described in conjunction with FIG. 3, which presents flowchart 300, showing an exemplary method of enabling identification of information content having enhanced desirability to a user, according to one embodiment of the present invention. Certain details and features have been left out of flowchart 300 that are apparent to a person of ordinary skill in the art. For example, a step may consist of one or more substeps or may involve specialized equipment or materials, as known in the art. While steps 310 through 370 indicated in flowchart 300 are sufficient to describe one embodiment of the present method, other embodiments may utilize steps different from those shown in flowchart 300, or may include more, or fewer steps.

Beginning with step 310 in FIG. 3 and system 100 in FIG. 1, step 310 of flowchart 300 comprises collecting content into information database 112. Collection of content into information database 112 in step 310 may correspond to importing information content concerning a specific entertainment genre, such as content dedicated to movies or television, for example, or to a particular movie or television series. In one embodiment, collection of content in step 310 corresponds to storing content relevant to a broad spectrum of subject matter drawn from multiple content sources. Content may be collected from sources local to content server 210, as well remote sources. Remotely provided content may be transmitted via a communication link over a LAN or other limited distribution network, or over packet network 128, in FIG. 1, such as the Internet, for example.

The exemplary method of flowchart 300 continues with step 320, which comprises updating the collected content according to one or more updating schedules. Updating of the collected content may be performed by aggregator 114, for example. In one embodiment, aggregator 114 updates content collected on information database 112 by pulling one or more RSS feeds corresponding to respective one or more subsets of the collected content, for example content dedicated to sports, news, or entertainment, or fashion related content. In other embodiments, aggregator 114 may update content collected on information database 112 in other ways, such as by pulling Atom feeds, or utilizing a push method via an Extensible Markup Language remote procedure call (XML-RPC), for example. Aggregator 114 may obtain updates according to a periodic updating schedule, by retrieving updated information after a predetermined time interval, such as every thirty minutes, for example.

In one embodiment, there may be more than one updating schedule associated with step 320, to reflect differences in the time sensitivity of a particular information content. For example, updates to information content relating to a television series in syndication may be pulled less frequently than information content relating to a current television series. As another example, the frequency with which information content relating to a current television series is updated may increase on the day of, or the day preceding or following broadcast of an episode, to complement user interest. In one embodiment, updating may occur dynamically, as the result of an input received from a user, such as a user of client computer 230, in FIG. 2.

Flowchart 300 continues with step 330, comprising filtering the updated content according to user or editorial interest. Step 330 may be performed in response to user inputs provided through interactive content selection application 216b, in FIG. 2. As explained previously in relation to FIG. 2, interactive content selection application 216b is configured to provide a user interface enabling filtering of the updated collected content stored on information database 212. Filtering may be performed by reference to at least one theme corresponding to subject matter of interest to the user of computer 230, to provide a plurality of filtered content items relevant to the identified theme. In one embodiment, filtering may occur according to inputs provided by a content administrator, for example a content editor or content producer with authority to control content stored on information database 212. It is noted that for the purposes of the present application, filtering refers to the process of returning search results matching the one or more themes identified as corresponding to desirable content.

An appropriate theme for filtering content items may be a general subject matter category, such as sports, news, fashion, or entertainment, for example. In one embodiment, a theme used for filtering may comprise an entertainment genre, such as television programming or movies, for example. In one embodiment, a theme used for filtering may comprise a particular television program, or movie. In another embodiment, a theme used for filtering may comprise fashion related content. In yet another embodiment, a theme used for filtering may comprise an entertainment artist. In an exemplary version of that latter embodiment, the filtering occurring in step 330 may be performed according to both the name of the entertainment artist and the name of a persona assumed by the entertainment artist. For example, in the case in which a theme used for filtering is the character Dr. Derek Shepherd of the television drama Grey's Anatomy, filtering may be performed to identify content items relating to name of the actor portraying Dr. Shepherd, i.e., Patrick Dempsey, and content items relating to the character nickname McDreamy, as well as content relating to the persona of Dr. Shepherd.

Moving on to step 340 of flowchart 300, step 340 comprises associating each item of filtered content with a respective visual representation. One of the advantages provided by the present invention is that identification of information content having enhanced desirability to a user becomes more intuitive for the user. One of the ways that this advantage is achieved, is by converting the analytical identification of content required by conventional approaches, which typically require scanning of a digest entry or synopsis, to a more visual, recognition based identification process. Step 340 may be performed by visualization module 218b, in FIG. 2, working in cooperation with interactive content selection application 216b, as shown.

In one embodiment, associating the items of filtered content with respective visual representations may correspond to assigning an image of a substantially identically shaped physical object to each item of filtered content. For example, each item of filtered content may be visually represented as a soap bubble, or sphere, suspended in space. In another embodiment, the associated visual representation may indicate how many of the one or more themes used for filtering resulted in retrieval of that item of content. According to that embodiment, an item of filtered content corresponding to only one theme may be visually represented by a regular tetrahedron, while an item corresponding to two themes may be depicted as a cube, and filtered content items corresponding to three or more filtering themes may be represented as spheres, for example.

Step 350 of flowchart 300 comprises labeling the respective visual representations with visual cues corresponding to discrimination criteria. Visualization module 218b may be configured so as to utilize one or more discrimination criteria to organize the filtered content and facilitate user identification of content having enhanced desirability. In some embodiments, discrimination criteria may be predetermined according to interactive content selection application 216b. In others, discrimination criteria may be user defined. In still other embodiments, discrimination criteria may comprise both predetermined and user defined selections. One or more discrimination criteria may be employed, comprising, for example, the popularity of a content item among a community of users, how recently a content item was created, and/or how recently the content item was updated.

Visualization module 218b is further configured to label the visual representations associated in step 340 with visual cues to enable transformation of the content identification process from a mentally taxing and time consuming analytical process, to an intuitive and rapid visual recognition process. Visual cues labeling a visual representation of a filtered content item as matching discrimination criteria may include changes in the shape, image size, or color of the visual representation, or changes in its distance from a reference point in a visual field, for example.

Continuing with step 360 of flowchart 300, step 360 comprises arranging the respective labeled visual representations into a display arrangement. In one embodiment, arrangement of the labeled visual representations into a logical display format may further enable identification of content having enhanced desirability. In one embodiment, the labeled visual representations may be arrayed, from left to right, for example, in order of their assessed desirability, based on the discrimination criteria. In one embodiment, the visual representations may be arranged radially, along concentric rings of any shape centered at a reference point corresponding to the present time. In that embodiment, the distance of a ring from the center reference point may correspond to the assessed desirability of the content items appearing on the ring, for example, on the basis of how recently the content items were created or updated, or their popularity among the community of users. In yet another embodiment, the labeled visual representations may be randomly arranged, so as to stimulate the user to interact more intensively with the visual presentation and to engage his or her visual faculties to identify information content having enhanced desirability through the visual cues with which the respective content items are labeled.

In step 370, the collected content in information database 212 may be supplemented by additional content provided through interactive content selection application 216b. Supplemental content received at content server 210 may be provided by a user of client computer 230, or by other members of a community of users. In one embodiment, supplemental content may be temporarily stored in a review archive, not shown in FIGS. 1 and 2, for a time interval during which the accuracy of the supplemental content may be confirmed. Once the accuracy of the supplemental content from a user is verified, for example, by cross reference with information from other sources, the supplemental content may be integrated with the collected content on information database 212, and be made accessible to all users. In one embodiment, for example, additional content provided as a supplement to the collected content may comprise one or more Universal Resource Locators (URLs) submitted by a user of client computer 230, or another user.

Figure 4:
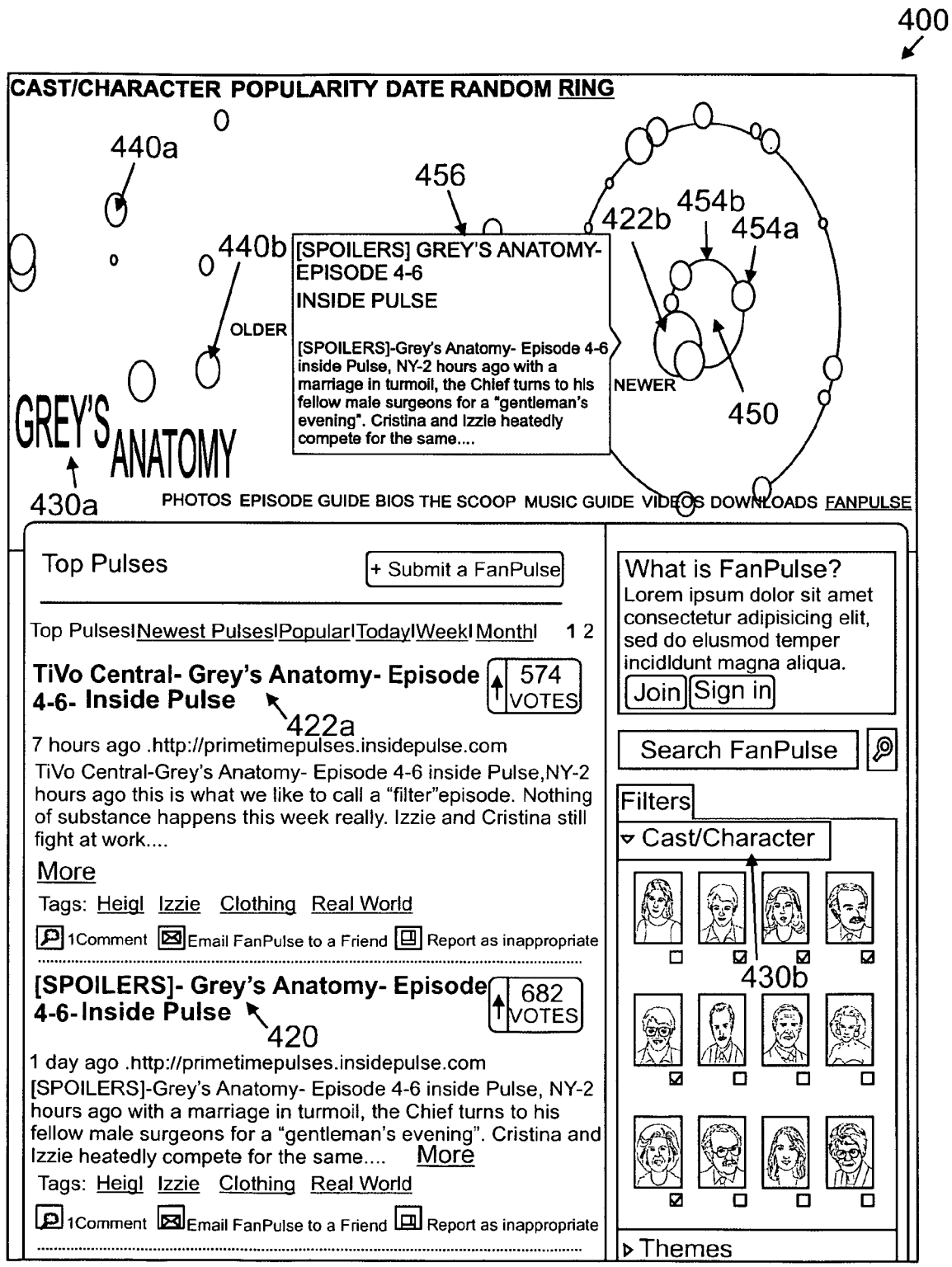
FIG. 4 shows a visual frame of an exemplary information site devoted to the television program Grey's Anatomy enabling identification of information content having enhanced desirability to a user, provided according to one embodiment of the present invention.

Turning now to FIG. 4, FIG. 4 shows visual frame 400 of an exemplary information site devoted to the television program Grey's Anatomy enabling identification of information content having enhanced desirability to a user, provided according to one embodiment of the present invention. As can be seen from FIG. 4, recently updated content items 420 and 422a are presented. That content has been filtered according to Grey's Anatomy theme 430a, selected by a user. Additional filtering of content related to Grey's Anatomy theme 430a may be performed according to character based filter 430b, which allows a user to designate filtering criteria by entering a checkmark in one or more registers corresponding to Grey's Anatomy characters.

In the embodiment of FIG. 4, the filtered content items are associated with spherical visual representations 440a, 440b, and other spheres shown in visual frame 400. Visual cues corresponding to the one or more discrimination criteria applied to the filtered content are shown by image size 454a, as well as distance 454b from reference point 450. As may be seen from FIG. 4, in the present embodiment, items of content are arranged radially along concentric rings centered at reference point 450 according to newness, wherein newer content items are arranged on rings closer to reference point 450, while older content items are arranged on rings farther from reference point 450. In addition, visual representations 440a, 440b, and the like are labeled by adjusting their respective image sizes to reflect their popularity among a community of users. As a result, a user may readily identify visualized content item 422b as being both recent and popular, and thus likely to contain information content having enhanced desirability to the user. Selecting visualized content item 422b causes content bubble 456 to be displayed, allowing the user to focus his or her analytical faculties only on those items of content likely to be of enhanced desirability. As can be seen from FIG. 4, arrangement of the labeled visual representations as shown in visual frame 400 results in the presentation of information content enabling rapid and intuitive identification of content likely to be of interest to the user.

Thus, the present application discloses methods and systems enabling identification of information content having enhanced desirability to a user. By associating filtered content items with visual representations, the present disclosure describes an approach that encourages identification of desired content through visual recognition rather than deductive analysis. By further labeling the visual representations with visual cues corresponding to discrimination criteria, the present application discloses an approach that renders the recognition process intuitive on the part of a user, in accord with their personal search preferences. Moreover, by arranging the labeled representations into a display arrangement, the present approach further facilitates identification of information content having enhanced desirability to the user.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method of enabling identification of Web content items having enhanced desirability to Web users, the method comprising:

collecting the Web content items into an information database, collating feedbacks from the Web users to indicate a popularity for each of the collected Web content items among the Web users in the information database;

dynamically updating the collected Web content items;

filtering the dynamically updated Web content items by referencing at least one theme, to provide a plurality of filtered and dynamically updated Web content items;

associating each of the plurality of filtered and dynamically updated Web content items with a respective visual representation;

labeling the respective visual representations with one or more visual cues corresponding to one or more discrimination criteria, including the popularity of the Web content items among the Web users, to enable identification of at least a Web content item having the enhanced desirability to the Web users, wherein the one or more visual cues corresponding to one or more discrimination criteria, including the popularity of the Web content items among the Web users, comprise a distance from a reference point of a display arrangement, wherein the labeled visual representations corresponding to more popular filtered and dynamically updated Web content items are closer to the reference point than the labeled visual representations corresponding to less Web popular filtered and dynamically updated Web content items;

arranging the labeled visual representations of the filtered and dynamically updated Web content items into the display arrangement; and displaying the display arrangement of the labeled visual representations of the filtered and dynamically updated Web content items;

wherein the arranging comprises distribution of the labeled visual representations among concentric rings spaced radially about the reference point.

2. The method of claim 1, wherein the updating comprises pulling one or more Really Simple Syndication (RSS) feeds.

3. The method of claim 1, wherein the updating comprises pulling one or more Atom feeds.

4. The method of claim 1, wherein the updating comprises utilizing an Extensible Markup Language remote procedure call (XML-RPC).

5. The method of claim 1, wherein the at least one theme used for the filtering comprises an entertainment genre.

6. The method of claim 1, wherein the at least one theme used for the filtering comprises one of news, sports, or fashion related Web content items.

7. The method of claim 1, wherein the at least one theme used for the filtering comprises a television program.

8. The method of claim 1, wherein the at least one theme used for the filtering comprises a movie.

9. The method of claim 1, wherein the at least one theme used for the filtering comprises an entertainment artist.

10. The method of claim 9, wherein the filtering is performed according to a name of the entertainment artist and a name of a persona assumed by the entertainment artist.

11. The method of claim 9, wherein the filtering is performed according to a nickname associated with a persona assumed by the entertainment artist.

12. The method of claim 1, wherein the one or more discrimination criteria to which the labeling corresponds comprise how recently the Web content items were created.

13. The method of claim 1, wherein the one or more discrimination criteria to which the labeling corresponds comprise how recently the Web content items were updated.

14. The method of claim 1, wherein the one or more visual cues corresponding to the one or more discrimination criteria comprise an image size of the respective visual representation.

15. The method of claim 1, further comprising supplementing the collected Web content items by additional Web content items received from one or more of the Web users.

16. The method of claim 15, wherein the additional Web content items comprises one or more Universal Resource Locators (URLs) received from one or more of the Web users.

17. A system for enabling identification of Web content items having enhanced desirability to Web users; the system comprising:
 a computer central processing unit (CPU);
 an information database accessible via a content server, the information database configured to store collected Web content items, the information database having collated feedbacks from the Web users to indicate a popularity for each of the collected Web content items among the Web users;
 an aggregator residing on the content server, the aggregator configured to dynamically update the collected Web content items;
 an interactive content selection application for accessing the updated collected Web content items, the interactive Web content selection application configured to provide a user interface enabling filtering of the dynamically updated collected Web content items by referencing at least one theme to provide a plurality of filtered and dynamically updated Web content items; and
 a visualization module for execution by the CPU and configured to associate each of the plurality of filtered and dynamically updated Web content items with a respective visual representation and to label the respective visual representations with one or more visual cues corresponding to one or more discrimination criteria, including the popularity of the Web content items among the Web users, to enable identification of at least a Web content item having the enhanced desirability to the Web users, wherein the one or more visual cues corresponding to one or more discrimination criteria, including the popularity of the Web content items among the Web users, comprise a distance from a reference point of a display arrangement, wherein the labeled visual representations corresponding to more popular filtered and dynamically updated Web content items are closer to the reference point than the labeled visual representations corresponding to less popular filtered and dynamically updated Web content items, wherein the visualization module is further configured to arrange the labeled visual representations of the filtered and dynamically updated Web content items into the display arrangement, and wherein the visualization module is further configured to display the display arrangement of the labeled visual representations of the filtered and dynamically updated Web content items;
 wherein the visualization module configured to arrange the labeled visual representations is further configured to distribute the labeled visual representations among concentric rings spaced radially about the reference point.

18. The system of claim 17, wherein the aggregator is configured to update the collected Web content items by pulling one or more Really Simple Syndication (RSS) feeds.

19. The system of claim 17, wherein the one or more visual cues corresponding to the one or more discrimination criteria comprise an image size of the respective visual representation.

20. The system of claim 17, wherein the one or more discrimination criteria to which the labeling corresponds comprise how recently the Web content items were created.

21. The system of claim 17, wherein the one or more discrimination criteria to which the labeling corresponds comprise how recently the Web content items were updated.

22. The system of claim 17, wherein the collected Web content items are supplemented by additional Web content items received from one or more of the Web users.

* * * * *